United States Patent Office 3,751,506
Patented Aug. 7, 1973

3,751,506
VAPOR-PHASE ALKYLATION IN PRESENCE OF CRYSTALLINE ALUMINOSILICATE CATALYST
George Thomas Burress, Beaumont, Tex., assignor to Mobil Oil Corporation
No Drawing. Filed May 12, 1972, Ser. No. 252,776
Int. Cl. C07c 3/52
U.S. Cl. 260—671 R    13 Claims

ABSTRACT OF THE DISCLOSURE

A process is provided for alkylation of aromatic hydrocarbons by contacting same with an alkylating agent in a reaction zone maintained under conditions such that said alkylation is accomplished in the vapor-phase and in the presence of a catalyst comprising a crystalline aluminosilicate zeolite characterized by a unique X-ray diffraction pattern, said catalyst under said conditions being capable of affording a high and selective yield of desired alkylaromatic product.

CROSS-REFERENCE TO RELATED APPLICATION

The subject matter of this application is related to that of application Ser. No. 252,884 filed on the same date herewith and entitled Vapor-Phase Alkylation in Presence of Crystalline Aluminosilicate Catalyst With Separate Transalkylation.

BACKGROUND OF THE INVENTION

Field of the invention

This invention is directed to the vapor-phase alkylation of aromatic hydrocarbons, including aromatic hydrocarbons containing a non-polar substituent, e.g. benzene or toluene, with an alkylating agent, e.g. an olefin, wherein the alkylation is performed in the presence of a new crystalline aluminosilicate zeolite characterized by long catalyst life, capable of affording high selectivity to desired products, e.g. alkylaromatics, and which is easily and effectively regenerated, when necessary, without substantial loss in activity.

Discussion of the prior art

Alkylation of aromatic hydrocarbon compounds employing certain crystalline aluminosilicate zeolite catalysts is known in the art. For instance, U.S. Pat. 3,251,897 describes liquid phase alkylation in the presence of crystalline aluminosilicates such as faujasite, heulandite, clinoptilolite, mordenite, dachiardite, zeolite X and zeolite Y. The temperature of such alkylation procedure does not exceed 600° F., thereby maintaining patentee's preferable operating phase as substantially liquid.

Also, U.S. Pat. 2,904,607 shows alkylation of hydrocarbon compounds in the presence of certain crystalline aluminosilicate zeolites. The zeolites described for use in this patent are crystalline metallic aluminosilicates, such as, for example, magnesium aluminosilicate.

U.S. Pats. 3,631,120 and 3,641,177 describe a liquid phase process for alkylation or aromatic hydrocarbons with olefins in the presence of certain zeolites. U.S. Pat. 3,631,120 discloses use of an ammonium exchange, calcined zeolite having a silica to alumina mole ratio of between 4.0 and 4.9. U.S. Pat. 3,641,177 discloses use of a zeolite catalyst activated in a particular manner.

Unfortunately, while the crystalline aluminosilicate catalysts proposed for such alkylation methods provide satisfactory initial yields of desired products, for the most part, their catalytic aging properties are not sufficiently good enough to warrant commercial application. Hence, it is of advantage to provide a satisfactory process for alkylating aromatic hydrocarbons using a crystalline aluminosilicate zeolite catalyst which has improved aging properties, i.e. maintains alkylation in high yield over a long, commercially attractive period of time, heretofore lacking in the art.

SUMMARY OF THE INVENTION

This invention contemplates a process for effecting vapor-phase alkylation of aromatic hydrocarbons, including aromatic hydrocarbons containing a non-polar substituent, which comprises contacting the aromatic hydrocarbon charge with an alkylating agent under conditions effective for accomplishing said vapor-phase alkylation including a reactor inlet temperature between about 650° F. and about 900° F., with a reactor bed temperature as much as 150° F. above the reactor inlet temperature, a pressure between atmospheric and 3000 p.s.i.g., employing a mole ratio of aromatic hydrocarbon to alkylating agent in the approximate range of 1:1 to 20:1 and a total feed weight hourly space velocity between about 2 and about 2000, in the presence of a catalyst comprising a crystalline aluminosilicate zeolite characterized by a unique specified X-ray powder diffraction pattern. The above weight hourly space velocity is based upon the weight of crystalline aluminosilicate. The new crystalline aluminosilicate zeolite used as a catalyst in the process of this invention is represented by the general formula, expressed in terms of mole ratios of oxides, as follows:

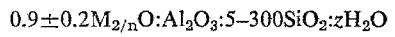

0.9±0.2M$_{2/n}$O:Al$_2$O$_3$:5–300SiO$_2$:zH$_2$O wherein M is a cation, predominately hydrogen, n is the valence of M and z is from 0 to 40.

DESCRIPTION OF SPECIFIC EMBODIMENTS

The catalysts useful in this invention belong to the family of zeolites known as zeolite ZSM-5. In a preferred synthesized form, the zeolite for use in the process of this invention has a formula, in terms of mole ratios of oxides, as follows:

0.9±0.2M$_{2/n}$O:Al$_2$O$_3$:5–300SiO$_2$:zH$_2$O wherein M is selected from the group consisting of a mixture of alkali metal cations, especially sodium, and tetraalkylammonium cations, the alkyl groups of which preferably contains 2 to 5 carbon atoms. Particularly preferred is a zeolite having the formula:

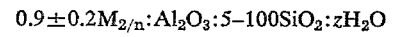

0.9±0.2M$_{2/n}$:Al$_2$O$_3$:5–100SiO$_2$:zH$_2$O

The original cations are replaced, in accordance with techniques well known in the art, at least in part, by ion exchange with hydrogen or hydrogen precursor cation. Although other cations may be used to replace the original cations, such as, for example, certain metal ions, a substantial portion of such replacing ions should be hydrogen or hydrogen precursor, such as ammonium ions. Hydrogen ions in the finished catalyst are preferred since they render the zeolite catalytically active for alkylation of aromatic hydrocarbon compounds, such as, for example, benzene, anthracene, naphthalene and toluene.

Members of the family of zeolites designated herein as ZSM-5 have an exceptionally high degree of thermal stability thereby rendering them particularly effective for use in processes involving elevated temperatures. In this connection, ZSM-5 zeolites appear to be one of the most stable families of zeolites known to date. However, it has been found that the alkylation process of this invention may may be carried out at reactor bed temperatures not in excess of about 1050° F., which eliminates many undesirable reactions that occur in catalytic alkylation of hydrocarbons carried out at higher temperatures. The deleterious effects of these reactions cause several basic problems for alkylation processes. At reactor bed temperatures substantially above 1050° F., the reactants and the alkylated products undergo degradation resulting in the loss of desired products and reactants. Undesirable residues are formed from the degradation reactions. In addition, olefins used as alkylating agents will polymerize with themselves or other reactants to form resinous compounds within the reaction zone. These resinous compounds together with the degradation products lead to the formation of coke-like deposits on the active surfaces of the catalyst. As a result, these deposits rapidly destroy the high activity of the catalyst and greatly shorten its effective life. Such undesirable effects are obviated under the conditions and with the catalyst employed in the present process.

Members of the family of ZSM-5 zeolites for use in the present invention possess a definite distinguishing crystalline structure whose X-ray diffraction pattern shows the following significant lines:

TABLE 1

| Interplanar spacing $d$ (A.): | Relative intensity |
|---|---|
| 11.1±0.3 | S |
| 10.0±0.3 | S |
| 7.4±0.2 | W |
| 7.1±0.2 | W |
| 6.3±0.2 | W |
| 6.04±0.2 | W |
| 5.56±0.1 | W |
| 5.01±0.1 | W |
| 4.60±0.08 | W |
| 4.25±0.08 | W |
| 3.85±0.07 | VS |
| 3.71±0.05 | S |
| 3.04±0.03 | W |
| 2.99±0.02 | W |
| 2.94±0.02 | W |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and $d$ (obs.), the interplanar spacing in A, corresponding to the recorded lines, were calculated. In Table 1 the relative intensities are given in terms of the symbols W=weak, S=strong and VS=very strong. It should be understood that this X-ray diffraction pattern is characteristic of all the species of ZSM-5 zeolites. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment. Various cation exchanged forms of ZSM-5 have been prepared. X-ray powder diffraction patterns of several of these forms are set forth below. The ZSM-5 forms set forth below are all aluminosilicates.

TABLE 2

[X-ray diffraction—ZSM-5 powder in cation exchanged forms, $d$ spacings observed]

| As made | HCl | NaCl | CaCl$_2$ | RECl$_3$ | AgNO$_3$ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
| | | 9.01 | 9.02 | | 8.99 |
| | 8.06 | | | | |
| 7.44 | 7.46 | 7.46 | 7.46 | 7.40 | 4.46 |
| 7.08 | 7.07 | 7.09 | 7.11 | | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 | | 5.38 | 5.37 | 5.38 | 5.37 |
| 5.13 | 5.11 | 5.14 | 5.12 | 5.14 | |
| 4.99 | 5.01 | 5.01 | 5.01 | 5.01 | 5.01 |
| | | 4.74 | | | |
| 4.61 | 4.62 | 4.62 | 4.61 | 4.63 | 4.62 |
| | | 4.46 | 4.46 | | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 | | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
| | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 2.35 |
| 3.31 | 3.31 | 3.32 | 3.31 | 3.32 | 3.32 |
| 3.25 | 3.25 | 3.26 | 3.25 | 3.25 | 3.26 |
| 3.17 | | | | 3.17 | 3.18 |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
| | | | | 2.97 | |
| | 2.95 | 2.95 | 2.94 | 2.95 | 2.95 |
| 2.86 | 2.87 | 2.87 | 2.87 | 2.87 | 2.87 |
| 2.80 | | | | | |
| 2.78 | | | 2.78 | | 2.78 |
| 2.73 | 2.74 | 2.74 | 2.73 | 2.74 | 2.74 |
| 2.67 | | | 2.68 | | |
| 2.66 | | | 2.65 | | |
| 2.60 | 2.61 | 2.61 | 2.61 | 2.61 | 2.61 |
| | 2.59 | | 2.59 | | |
| 2.57 | | 2.57 | 2.56 | | 2.57 |
| 2.50 | 2.52 | 2.52 | 2.52 | 2.52 | |
| 2.49 | 2.49 | 2.49 | 2.49 | 2.49 | 2.49 |
| | | | 2.45 | | |
| 2.41 | 2.42 | 2.42 | 2.42 | 2.42 | |
| 2.39 | 2.40 | 2.40 | 2.39 | 2.40 | 2.40 |
| | | | 2.38 | 2.35 | 2.38 |
| | 2.33 | | 2.33 | 2.32 | 2.33 |
| | 2.30 | | | | |
| | 2.24 | 2.23 | 2.23 | | |
| | 2.20 | 2.21 | 2.20 | 2.20 | |
| | 2.18 | 2.18 | | | |
| | | 2.17 | 2.17 | | |
| | 2.13 | | 2.13 | | |
| | 2.11 | 2.11 | | 2.11 | |
| | | | 2.10 | 2.10 | |
| | 2.08 | 2.08 | | 2.08 | 2.08 |
| | | 2.07 | 2.07 | | |
| | | | 2.04 | | |
| 2.01 | 2.01 | 2.01 | 2.01 | 2.01 | 2.01 |
| 1.99 | 2.00 | 1.99 | 1.99 | 1.99 | 1.99 |
| | | | 1.97 | 1.96 | |
| 1.95 | 1.95 | 1.95 | 1.95 | 1.95 | |
| | | | | 1.94 | |
| | 1.92 | 1.92 | 1.92 | 1.92 | 1.92 |
| 1.91 | | | | 1.91 | |
| | | | | 1.88 | |
| 1.87 | 1.87 | 1.87 | 1.87 | 1.87 | 1.87 |
| | 1.86 | | | | |
| 1.84 | 1.84 | | | 1.84 | 1.84 |
| 1.83 | 1.83 | 1.83 | 1.83 | 1.83 | |
| 1.82 | | 1.81 | | 1.82 | |
| 1.77 | 1.77 | 1.79 | 1.78 | | 1.77 |
| 1.76 | 1.76 | 1.76 | 1.76 | 1.76 | 1.76 |
| | | 1.75 | | | 1.75 |
| | 1.74 | 1.74 | 1.73 | | |
| 1.71 | 1.72 | 1.72 | 1.71 | | 1.70 |
| 1.67 | 1.67 | 1.67 | | 1.67 | 1.67 |
| 1.66 | 1.66 | | 1.66 | 1.66 | 1.66 |
| | 1.65 | 1.65 | | | |
| | 1.64 | 1.64 | | | |
| | 1.63 | 1.63 | 1.63 | 1.63 | 1.62 |
| | 1.61 | 1.61 | 1.61 | | 1.61 |
| 1.58 | | | | | |
| | 1.57 | 1.57 | | 1.57 | 1.57 |
| | | 1.56 | 1.56 | 1.56 | |

Zeolite ZSM-5 for use in this invention can be suitably prepared by preparing a solution containing tetrapropylammonium hydroxide, sodium oxide, an oxide of aluminum, an oxide of silicon and water having a composition, in terms of mole ratios of oxides, falling within the following ranges:

TABLE 3

| | Acceptable | Preferred | Particularly preferred |
|---|---|---|---|
| OH$^-$/SiO$_2$ | 0.7–10.0 | 0.1–0.8 | 0.2–0.75 |
| R$_4$N$^+$/(R$_4$N$^+$+Na) | 0.2–0.95 | 0.3–0.9 | 0.4–0.9 |
| H$_2$O/OH$^-$ | 10–300 | 10–300 | 10–300 |
| SiO$_2$/Al$_2$O$_3$ | 5–300 | 10–100 | 10–60 | wherein R is propyl and maintaining the mixture until crystals of the zeolite are formed. It is noted that an excess of tetrapropylammonium hydroxide can be used which would raise the value of OH$^-$/SiO$_2$ above the ranges set forth above. The excess hydroxide, of course, does not participate in the reaction. Thereafter, the crystals are separated from the liquid and recovered. Typical reaction conditions consist of heating the foregoing reaction mixture to a temperature of from about 100° C. to 175° C. for a period of time of from about six hours to 60 days. A more preferred temperature range is from about 150° C. to 175° C. with the amount of time at a temperature in such range being from about 12 hours to 8 days.

The digestion of the gel particles is carried out until crystals form. The solid product is separated from the reaction medium, as by cooling the whole to room temperature, filtering and water washing.

The foregoing product is dried, e.g. at 230° F., for from about 8 to 24 hours. Of course, milder conditions may be employed if desired, e.g. room temperature under vacuum.

To prepare the preferred form of the catalyst for use herein, the composition can be prepared utilizing materials which supply the appropriate oxide. Such compositions include sodium aluminate, alumina, sodium silicate, silica hydrosol, silica gel, silicic acid, sodium hydroxide and tetrapropylammonium compounds, e.g. tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The hydrogen cation can be supplied by an aqueous solution of hydrogen chloride or ammonium salts, i.e. ammonium nitrate or ammonium chloride. The reaction mixture can be prepared either batchwise or continuously. Crystal size and crystallization time of the ZSM-5 composition will vary with the nature of the reaction mixture employed.

For the alkylation process of this invention, if desired, the ZSM-5 zeolite catalyst can be employed in combination with a support or binder material such as, for example, a porous inorganic oxide support or a clay binder. Non-limiting examples of such binder materials include alumina, zirconia, silica, magnesia, thoria, titania, boria and combinations thereof, generally in the form of dried inorganic oxide gels and gelatinous precipitates. Suitable clay materials include, by way of example, bentonite and kieselguhr. The relative proportion of crystalline aluminosilicate ZSM-5 of the total composition of catalyst and binder or support may vary widely with the ZSM-5 content ranging from between about 1 to about 90 percent by weight and more usually in the range of about 5 to about 80 percent by weight of the composition.

Exemplary of the hydrocarbons which may be alkylated by the process of this invention are aromatic compounds such as benzenes, naphthalenes, anthracenes, and the like and substituted derivatives thereof; and alkyl substituted aromatics, e.g. toluene, xylene, and homologs thereof. In addition, other non-polar substituent groups may also be attached to the nucleus of the aromatic ring including by way of example Methyl ($—CH_3$)

Ethyl ($—C_2H_5$)

Tert-butyl ($—C(CH_3)_3$)

Alkyl ($—C_nH_{(2n+1)}$)

Cycloalkyl ($—C_nH_{(2n-1)}$)

Phenyl ($C_6H_5$)

Naphthyl ($C_{10}H_7$)

and

Aryl (any aromatic radical)

In accordance with this invention, the preferred alkylating agents are olefins such as ethylene, propylene, dodecylene, as well as formaldehyde, alkyl halides and alcohols; the alkyl portion thereof having from 1 to 24 carbon atoms. Numerous other acyclic compounds having at least one reactive alkyl radical may be utilized as alkylating agents.

Operating conditions employed in the process of the present invention are critical and will be dependent, at least in part, on the specific alkylation reaction being effected. Such conditions as temperature, pressure, space velocity and molar ratio of the reactants and the presence of inert diluents will have important affects on the process. Accordingly, the manner in which these conditions affect not only the conversion and distribution of the resulting alkylated products but also the rate of deactivation of the catalyst will be described below.

The process of this invention is conducted such that alkylation of an aromatic hydrocarbon compound, exemplified by benzene, with an alkylating agent, such as an olefin, exemplified by ethylene, is carried out in the vapor-phase by contact in a reaction zone, such as, for example, a fixed bed of catalyst, under alkylation effective conditions, said catalyst being characterized as the above-defined ZSM-5 which has been hydrogen exchanged such that a predominate portion of its exchangeable cations are hydrogen ions. In general, it is contemplated that more than 50 percent and preferably more than 75 percent of the cationic sites of the ZSM-5 zeolite will be occupied by hydrogen ions. The alkylatable aromatic compound and alkylating agent are desirably fed to a first stage at an appropriate mole ratio of one to the other. The feed to such first stage is heated. After some reaction takes place, such as, for example, when about 80 percent of the alkylating agent is consumed, the effluent of the first stage is cooled to remove heat of reaction and more alkylating agent is added (second stage) to maintain the mole ratio of aromatic compound to alkylating agent within the range established for the first stage. A plurality of reaction stages are possible for the process of this invention. It is generally desirable to provide cooling between reactor stages.

Considering vapor-phase alkylation of benzene with ethylene, the first stage mole ratio of benzene to ethylene may be in the range of about 1:1 to about 20:1. The first stage feed is heated to a reactor inlet temperature within the range of about 650° F. to about 900° F. at a pressure within the range of about atmospheric to about 3000 p.s.i.g. Preferred inlet temperatures fall within the range of about 700° F. to about 850° F. and preferred pressures fall within the range of about 25 p.s.i.g. to about 450 p.s.i.g. The repeating of reaction staging is carried out while maintaining an overall aromatic hydrocarbon, e.g. benzene, to alkylating agent, e.g. ethylene, mole ratio of about 1:1 to about 20:1, with a preferred range of about 2.5:1 to about 16:1. As the reaction proceeds through the stages, the aromatic:alkylating agent mole ratio increases.

It is noted that extremely high total feed space velocities are possible in the process of this invention, i.e. up to 2000 lb. total feed/hr.-lb. crystalline aluminosilicate. An important factor in the present process is, however, the weight hourly space velocity (WHSV) of the alkylating agent, e.g. ethylene. The alkylating agent WHSV to each of any alkylation reactor stages is maintained between about 1 and about 10 lb. alkylating agent/ hr.-lb. crystalline aluminosilicate. The most desirable ethylene, i.e. alkylating agent, WHSV is within the range of about 2 to about 6 lb. ethylene/hr.-lb. crystalline aluminosilicate. When the ethylene WHSV is maintained within the above limits, an economical cycle between regenerations of catalyst exists.

The following examples will serve to illustrate the process of the invention, without unduly limiting same.

EXAMPLE 1

A solution composed of 240 pounds of Q-brand sodium silicate (28.5 weight percent $SiO_2$, 8.8 weight percent $Na_2O$ and 62.7 weight percent $H_2O$) and 300 pounds of water was continuously mixed with a second solution containing 7.3 pounds of $Al_2(SO_4)_3 \cdot xH_2O$ (16.7 weight percent $Al_2O_3$), 30 pounds of tetrapropylammonium bromide, 20 pounds of $H_2SO_4$, 90 pounds of NaCl and 410 pounds of $H_2O$ in a mixing nozzle. The resultant gelatinous precipitate was discharged from the nozzle into an agitated 120 gallon vessel. The vessel was heated to 210° F. and held for 8 days while agitating at 24 r.p.m. The product was 90 percent ZSM-5 by X-ray diffraction. Chemical analysis of the product showed $SiO_2/Al_2O_3$ of 67.0. The crystallized product was washed essentially free of soluble salts by decantation, then filtered. The washed filter cake was dried at about 250° F. A portion of the dried cake was then blended with hydrated alpha-$Al_2O_3 \cdot H_2O$ and additional $H_2O$ in a muller mixer to obtain a mass of extrudable consistency. The ZSM-5 and the $Al_2O_3$ were blended in proportion to give 65 percent ZSM-5 and 35 percent $Al_2O_3$ in the final product. The blended mixture was then extruded thru $\frac{1}{16}$" opening die plate using a ram type extruder. The extrudate was then dried at about 250° F. in air and then calcined for 3 hours at 700° F. in air. After cooling, the extrudate was ion exchanged 4 times, one hour each with 5 percent $NH_4Cl$ solution at room temperature using 5 cc. of solution/gm. of dried extrudate. The extrudate was washed free of soluble chlorides then dried at 250° F.

At a benzene/ethylene mole ratio of 2.8 and over the above ZMS-5 containing catalyst, conversion of ethylene at 40-70 percent was maintained for 14 days. The selectivity to ethylbenzene, diethylbenzene and triethylbenzene gradually increased from about 90 percent to 95-97 percent. The inlet temperature was maintained at 750° F. for 12 days, and then increased to 775° F. as the conversion gradually decreased. Nitrogen diluent gas was added to the feed stream, and the nitrogen/ethylene mole ratio in the feed was 0.5. The ethylbenzene/polyethylbenzene weight ratio decreased from an initial value of 5.5 to about 3.5.

The reactor was left shut-down and liquid-full for approximately two days. The run was continued later with the initial temperature being the same as the initial start-up temperature, 750° F. Conversion of ethylene was about 25 percent. With the reduced conversion, the selectivity increased steadily from 97.5 percent at 25 percent conversion to about 99.5-100 percent at conversions below 10 percent. At the end of 20 days the temperature was raised from 750° F. to 800° F. and after 25 days from 800° F. to 850° F. After a total of 34 days on stream the run was ended. The catalyst was then regenerated by burning with an air stream to a final bed temperature of 1000° F.

EXAMPLE 2

These runs, indicating that higher space velocities and higher benzene/ethylene ratios reduced the formation of by-products and thus increased selectivity, were conducted at a WHSV of 42 lb. total feed/hr.-lb. crystalline aluminosilicate with a benzene/ethylene mole ratio of 7.5.

The catalyst was that which was regenerated from Example 1. The only variable changed was the starting temperature at the reactor inlet. Changing this variable had a dramatic effect on the deactivation rate of the catalyst. At a starting inlet temperature of 600° F., conversions of ethylene of 30-40 percent were obtained for two days. The inlet temperature was raised to 650° F. at this point and ultimately to 750° F. after six days. A maximum conversion of ethylene of 50 percent was reached during the third day. After the fourth day the conversion remained below 5 percent until the run was terminated after 7 days. The selectivity during this run was in the range of 97 to 97.5 percent.

EXAMPLE 3

After catalyst regeneration by burning with an air stream to a final bed temperature of 1000° F., Example 3 was started under the same conditions as in Example 2 but with an initial inlet temperature of 700° F. Initial conversion was higher than that observed during Example 2. The maximum conversion dropped almost linearly by about 4 percent per day until the run was ended after 15 days at which point the conversion was about 18 percent.

During the tenth day of operation, the inlet temperature was raised from 700° F. to 750° F. with no apparent effect on the conversion or rate of deactivation. The weight ratio of ethylbenzene to polyethylbenzene increased from 7.5 to 10 when the temperature was raised, however.

During the twelfth day the reactor pressure was increased from atmospheric pressure to 25 p.s.i.g. with no discernable effect. Selectivity was in the range of 99 percent during the first 13 days of the run, after which it dropped to 97.0-97.5 percent. The run was ended after 15.5 days.

EXAMPLE 4

This run was started after the catalyst from Example 3 had been regenerated in the same manner as for Example 3 and with a reactor inlet temperature of 750° F. and a WHSV of 42 lb. total feed/hr.-lb. catalyst. The initial conversion of ethylene was about 80 percent. This figure dropped to about 67 percent over a 37-day period. The conversion remained about 70 percent for about 30 days. During this period the selectivity initially in the range of 97-97.5 percent, rose and leveled off at 98.5-99.0.

The run continued for 48 days. Durnig the last 10 days a recycle feed comprising about 10 weight percent ethylbenzene was used as feedstock to simulate the second reactor in a series of 4. The product from runs in which benzene and ethylene were used as feeds was collected.

EXAMPLE 5

The product collected from Example 4 was then fed to the reactor starting on the thirty-seventh day of the run. Additional ethylene sufficient to give a benzene/ethylene ratio of 6.6 moles/mole was fed to the reactor.

Conversions dropped from about 65 percent to 55 percent when the feed was changed from benzene to recycle feed. This may be attributed to the lower concentration of benzene in the feed. The selectivity appeared to drop only silghtly. The conversion was relatively stable, 52-54 percent, for 7 or 8 days before beginning to decline slightly. During the last day of the run, the temperature was increased to 775° F.

EXAMPLE 6

This run was made with catalyst that had been used and regenerated eight times in the manner used for Example 3.

The initial conditions for this run were similar to those for Examples 4 and 5 to determine if the catalyst had lost activity. The initial conversion was about 75 percent and decreased to about 69 percent after 8 days compared to conversions of 80 percent for the same periods of Example 4.

At this point the reactor pressure was increased to 50 p.s.i.g. which affected significant changes in unit performance. The ethylene conversion increased from about 70 percent to 90-95 percent and the ethylbenzene to polyethylbenzenes weight ratio (EB/PEB) increased from 12:1 to 22:1. The maximum observed reactor temperature also increased when the pressure was increased. The conversion remained over 90 percent for 21 days at which time the reactor pressure was increased to 260 p.s.i.g.

The ethylene rate was then increased which resulted in a noticeable drop in selectivity. This decreased the benzene to ethylene ratio to about 5.7. Later the space velocity was increased to approximately 62 and the benzene to ethylene ratio was increased to approximately 6.7 in an attempt to improve the selectivity. However, due to the design of the reactor system an increase in feed rate at a given catalyst bed inlet temperature also increases the temperature in the catalyst bed. The selectivity decreased even more at these conditions indicating a temperature effect on selectivity.

EXAMPLE 7

The feed to Example 6 was changed on the 43rd day to a feedstock that simulated a second reactor in series, i.e. about 18 weight percent ethylbenzene. The conversion dropped slightly to 85–90 percent and the selectivity dropped to 90–92 percent. The reactor inlet temperature was decreased in 20° F. steps from 750° F. to 710° F. which served to increase the selectivity to 97 percent. The run was terminated on the 53rd day.

EXAMPLE 8

This run was made using 1/16″ extrudate of fresh hydrogen ZSM-5 catalyst prepared according to Example 1. The feed charge was benzene.

The conversion was 85–90 percent and the selectivity was about 99.5 percent. On the nineteenth day the reactor pressure was increased to about 260 p.s.i.g. at which point the conversion increased to 98+ percent. The benzene to ethylene ratio of the feed was reduced in steps from about 8:1 to about 5:1 by increasing the ethylene rate with no noticeable effect on conversion. However, the selectivity did decrease to about 98 percent at 5 to 1 benzene to ethylene ratio.

The maximum observed reactor temperature also increased as the benzene to ethylene ratio of the feed was decreased. During this run at the higher pressure it was evident that the bulk of reaction was occurring over a very small section of the bed. The temperature profile indicated the reaction was occurring over less than one-sixth of the catalyst bed. This run was terminated after 53 days.

EXAMPLE 9

The catalyst for this run was 58.5 g. of 1/16″ extrudate containing about 2.93 g. of hydrogen ZSM-5 catalyst. This catalyst was prepared in the non-ion exchanged form essentially as in Example 1 and had the following analysis in the "dried-only" state:

| Component: | Wt. percent |
|---|---|
| $Al_2O_3$ | 2.23 |
| $SiO_2$ | 93.90 |
| C | 7.40 |
| N | 0.69 |
| Na | 1.40 |

The crystalline aluminosilicate zeolite was then diluted with alumina, mixed, mulled, extruded and dried. Precalcination was performed with nitrogen at a temperature of 700° F. for 3 hours. The extrudate was then ion exchanged with 5 percent aqueous ammonium chloride solution for 4 hours, water washed for 8 hours and then dried. It was again calcined with air at 1000° F. for 3 hours.

This example was performed to evaluate usefulness of catalyst with a low active ingredient, i.e. ZSM-5, concentration. A qualitative evaluation based on the temperature peak indicated very high activity for this 5 percent catalyst relative to the 65 percent catalyst of previous runs. During the 5th day, water injection was started to determine the feasibility of temperature control by water quench. The off gas rate began slowly and steadily increasing during the water injection. The reactor temperature was increased in 50° F. increments to 850° F. These temperature increases did slightly retard the deactivation but did not stop the steady increase in off gas. This run was terminated after 14 days and the catalyst was removed.

This invention is now illustrated with the specific examples outlined in the following table.

TABLE 4

[Vapor-phase alkylation of benzene with ethylene over hydrogen ZSM-5]

| Example No. | Feed [1] | Inlet temp., °F. | Pressure, p.s.i.g. | WHSV [2] | Benzene/ ethylene mole/mole |
|---|---|---|---|---|---|
| 1 | 1 | 750–800 | Atmospheric | 7 | 2.8 |
| 2 | 1 | 600–750 | do | 42 | 7.5 |
| 3 | 1 | 700–750 | Atmospheric-25 | 42 | 7.5 |
| 4 | 1 | 750 | Atmospheric | 42 | 7.5 |
| 5 | 2 | 750 | do | 42 | 6.6 |
| 6 | 1 | 750 | Atmospheric-260 | 42–61 | 5.7–9.2 |
| 7 | 3 | 710–750 | 260 | 42 | 4.5 |
| 8 | 1 | 750 | Atmospheric-260 | 42 | 5–8 |
| 9 | 1 | 750 | 260 | 74 | 4–5 |

[1] Key to feed compositions in weight percent of total feed:

| Components | 1 | 2 | 3 |
|---|---|---|---|
| Light ends | 0.05 | | 0.02 |
| Benzene | 99.9 | | |
| Toluene | | 0.06 | 0.04 |
| Ethylbenzene | | 10.07 | 17.55 |
| Xylenes, cumene | | 0.15 | 0.16 |
| Others [3] | | 0.06 | 0.10 |
| Diethylbenzenes | | 1.24 | 1.45 |

[2] WHSV is measured in lb. total feed/hr.-lb. crystalline aluminosilicate.
[3] n-Propylbenzene, ethyltoluenes, secondary butylbenzene and trace unidentified components.

Further examples demonstrating the process of the present invention, and in particular the effect of pressure, are outlined as follows:

EXAMPLE 10

| | A | B |
|---|---|---|
| Reactor pressure, p.s.i.g. | 0 | 50 |
| Catalyst (same as in Example 1) weight | 3.84 | 3.84 |
| Ethylene rate, g. mole/hr | 0.207 | 0.207 |
| Benzene feed rate, g. mole/hr | 9.16 | 9.16 |
| Reactor inlet temperature, °F | 750 | 750 |
| Maximum observed reactor temperature, °F | 820 | 845 |
| Product weight, g./hr | 155.2 | 156.8 |
| Liquid product composition, wt. percent: | | |
| Ethylbenzene | 9.34 | 12.93 |
| Diethylbenzenes | 0.80 | 0.53 |

EXAMPLE 11

| | A | B |
|---|---|---|
| Reactor pressure, p.s.i.g. | 0 | 260 |
| Catalyst (same as in Example 8) weight, g | 9.88 | 9.88 |
| Ethylene rate, g. mole/hr | 0.657 | 0.645 |
| Benzene feed rate, g. mole/hr | 8.14 | 8.22 |
| Reactor inlet temperature, °F | 750 | 750 |
| Maximum observed reactor temperature, °F | 760 | 772 |
| Product weight, g./hr | 425.6 | 427.7 |
| Liquid product composition, wt. percent: | | |
| Ethylbenzene | 12.35 | 14.30 |
| Diethylbenzenes | 1.32 | 1.05 |

Further examples demonstrating the process of the present invention with the alkylating agents formaldehyde and methyl alcohol and the aromatic hydrocarbon charges xylene and toluene are as follows:

EXAMPLE 12

Over a fixed bed of catalyst as prepared in Example 1 a feed of toluene was contacted with the alkylating agent formaldehyde in the mole ratio of toluene to formaldehyde of 2:1. The reactor inlet temperature was 750° F. and the reactor pressure was maintained at atmospheric. The total feed weight hourly space velocity was 4. The composition of the liquid product was as follows:

| Component: | Wt. percent total product |
|---|---|
| Toluene | 36 |
| Xylenes | 46 |
| $C_9$ | 15 |
| $C_9^+$ | 1 |
| Others (unidentified) | 2 |

EXAMPLE 13

Over a fixed bed of catalyst as prepared in Example 1 a feed of m-xylene was contacted with the alkylating agent methyl alcohol in the mole ratio of m-xylene to methyl alcohol of 2:1. The reactor inlet temperature was 750° F. and the reactor pressure was maintained at atmospheric. The total feed weight hourly space velocity was 4. The composition of the liquid product was as follows:

| Component: | Wt. percent total product |
|---|---|
| Toluene | 3 |
| Xylenes | 71 |
| $C_9$ | 17 |
| $C_9^+$ | 6 |
| Others (unidentified) | 3 |

EXAMPLE 14

Over a fixed bed of catalyst as prepared in Example 1 a feed of toluene was contacted with the alkylating agent methyl alcohol in the mole ratio of toluene to methyl alcohol of 2:1. The reactor inlet temperature was 870° F. and the reactor pressure was maintained at atmospheric. The total feed weight hourly space velocity was 4. The composition of the liquid product was as follows:

| Component: | Wt. percent total product |
|---|---|
| Toluene | 47 |
| Xylenes | 39 |
| $C_9$ | 12 |
| $C_9^+$ | 1 |
| Others (unidentified) | 1 |

EXAMPLE 15

Over a fixed bed of catalyst as prepared in Example 1 a feed of benzene was contacted with the alkylating agent methyl alcohol in the mole ratio of benzene to methyl alcohol of 2:1. The reactor inlet temperature was 760° F. and the reactor pressure was maintained at atmospheric. The total feed weight hourly space velocity was 4. The composition of the liquid product was as follows:

| Component: | Wt. percent total product |
|---|---|
| Benzene | 42 |
| Toluene | 25 |
| Xylenes | 19 |
| $C_9$ | 9 |
| $C_9^+$ | 3 |
| Others (unidentified) | 2 |

It will be noted from the examples of this invention that the vapor-phase alkylation of aromatic hydrocarbon compounds by contacting with the hydrogen ZSM-5 catalyst provides substantial benefits over alkylation with other catalysts known in the art for alkylation. For example, and possibly the most important fact, hydrogen ZSM-5 crystalline alumino-silicate zeolite catalyst exhibits markedly improved ageing properties. Instead of cycle periods of a few hours or days as has been the practice of the prior art, a cycle of weeks or months is possible.

In addition to increased selectivity toward a desired product, the hydrogen ZSM-5 catalyst used in the process of this invention is easily and effectively regenerated utilizing adiabatic burning in the presence of an inert dry gas as an oxygen diluent.

Also, the hydrogen ZSM-5 catalyst employed in the process of this invention will withstand numerous regenerations without losing activity. Thus, it is contemplated that a catalyst life in commercial use may be several years.

Other advantages and improvements achieved by the process of this invention over the art are evident. They may be listed as follows:

(1) Pretreatment and drying of feed is not necessary.
(2) Extremely high space velocities are possible. This leads to higher yields with smaller reactors.
(3) Easy temperature control is feasible.
(4) In the instance where benzene is alkylated with ethylene, selectivity improves as the benzene to ethylene ratio is increased. This is increasingly important for feed containing ethylbenzenes and other alkylation products.
(5) A catalyst with a very low active ingredient concentration is useful.

It will be appreciated that the examples set forth above are merely illustrative and that aromatic hydrocarbons including aromatic hydrocarbons containing a non-polar substituent, may be alkylated in accordance with the present invention.

It will also be appreciated that the operating conditions for the alkylation reactions in accordance with the process of this invention, as exemplified in the foregoing examples, may be varied within the limits specified so that the process may be conducted in vapor phase, depending on product distribution, degree of alkylation, rate of catalyst deactivation, and operating pressures and temperatures, and that various modifications and alterations may be made in the process of this invention without departing from the spirit and scope thereof.

What is claimed is:

1. A process for effecting vapor-phase alkylation of an aromatic hydrocarbon charge selected from the group consisting of aromatic hydrocarbons and aromatic hydrocarbons containing a non-polar substituent which comprises contacting said hydrocarbon charge with an alkylating agent under conditions effective for accomplishing said vapor-phase alkylation including a reactor inlet temperature between about 650° F. and about 900° F., a reactor pressure between atmospheric and about 3000 p.s.i.g., employing a mole ratio of hydrocarbon charge to alkylating agent in the approximate range of 1:1 to 20:1 and a weight hourly space velocity between about 2 and 2000 in the presence of a catalyst comprising a crystalline aluminosilicate zeolite characterized by the X-ray diffraction pattern of Table 1 and a formula, expressed in terms of mole ratios of oxides, as follows:

$$0.9 \pm 0.2 M_{2/n}O : Al_2O_3 : 5-300 SiO_2 : zH_2O$$

wherein M is a cation predominately hydrogen, n is the valence of M and z is from 0 to 40, said weight hourly space velocity being based upon the weight of said crystalline aluminosilicate.

2. The process of claim 1 wherein the reactor inlet temperature is between about 700° F. and 850° F. and the reactor pressure is between about 25 and 450 p.s.i.g.

3. The process of claim 1 wherein the crystalline aluminosilicate zeolite is characterized by a $SiO_2:Al_2O_3$ ratio between about 5 and 100.

4. The process of claim 1 wherein the crystalline aluminosilcate zeolite is combined in an amount between about 1 and about 90 weight percent in a binder therefor.

5. The process of claim 4 wherein said binder is alumina.

6. The process of claim 1 wherein said alkylating agent is an olefin.

7. A process for producing ethylbenzene which comprises contacting benzene and ethylene in a reaction zone at a temperature between about 650° F. and 900° F., a pressure between about atmospheric and about 3000 p.s.i.g., employing a mole ratio of benzene to ethylene within the approximate range of 1:1 and 20:1 and a weight hourly space velocity between about 2 and about 2000 in the presence of a catalyst comprising a crystalline aluminosilicate zeolite characterized by the X-ray diffraction pattern of Table 1 and a formula, expressed in terms of mole ratios of oxides, as follows:

$$0.9 \pm 0.2 M_{2/n}O : Al_2O_3 : 5-300 SiO_2 : zH_2O$$

wherein M is a cation predominately hydrogen, n is the valence of M and z is from 0 to 40, said weight hourly space velocity being based upon the weight of said crystalline aluminosilicate.

8. The process of claim 7 wherein the reactor temperature is between about 700° F. and 850° F. and the reactor pressure is between about 25 and 450 p.s.i.g.

9. The process of claim 8 wherein the crystalline aluminosilicate zeolite is characterized by a $SiO_2:Al_2O_3$ ratio between about 5 and 100.

10. The process of claim 7 wherein the crystalline aluminosilicate zeolite is combined in an amount between about 1 and about 90 weight percent in a binder therefor.

11. The process of claim 10 wherein the crystalline aluminosilicate zeolite is combined in an amount between about 5 and about 80 weight percent in a binder therefor.

12. The process of claim 11 wherein said binder is alumina.

13. The process of claim 1 wherein said alkylating agent is formaldehyde or an alcohol.

References Cited
UNITED STATES PATENTS

| | | | |
|---|---|---|---|
| 3,476,821 | 11/1969 | Brandenburg et al. | 260—672 |
| 3,578,723 | 5/1971 | Bowes et al. | 260—672 T |
| 3,637,880 | 1/1972 | Burress | 260—672 T |
| 3,660,309 | 5/1972 | Hayes et al. | 252—455 Z |
| 3,677,973 | 7/1972 | Mitsche et al. | 260—672 T |

CURTIS R. DAVIS, Primary Examiner

U.S. Cl. X.R.

260—671 C, 671 M; 252—455 Z

PO-1050
(5/69)

UNITED STATES PATENT OFFICE
CERTIFICATE OF CORRECTION

Patent No. 3,751,506  Dated August 7, 1973

Inventor(s) GEORGE THOMAS BURRESS

It is certified that error appears in the above-identified patent and that said Letters Patent are hereby corrected as shown below:

| | |
|---|---|
| Column 2, line 46, | "$0.9 \pm 0.2 M_{\frac{2}{n}} : Al_2O_3 : 5\text{-}100\ SiO_2 : zH_2O$" should be --$0.9 \pm 0.2 M_{\frac{2}{n}}O : Al_2O_3 : 5\text{-}100\ SiO_2 : zH_2O$--. |
| Column 2, line 66, | "may may be carried out" should be --may be carried out--. |
| Column 4, line 12, | "2.35" should be --3.35--. |
| Column 7, line 27, | "ZMS-5" should be --ZSM-5--. |
| Column 8, line 32, | "Durnig" should be --During--. |
| Claim 9, line 1, | "8" should be --7--. |

Signed and sealed this 5th day of March 1974.

(SEAL)
Attest:

EDWARD M. FLETCHER, JR.
Attesting Officer

C. MARSHALL DANN
Commissioner of Patents